United States Patent
Stufflebeam

(10) Patent No.: US 10,103,882 B2
(45) Date of Patent: Oct. 16, 2018

(54) ENCRYPTION KEY LIFECYCLE MANAGEMENT

(71) Applicant: Dell Products, L.P., Round Rock, TX (US)

(72) Inventor: Kenneth Wade Stufflebeam, Georgetown, TX (US)

(73) Assignee: Dell Products, L.P., Round Rock, TX (US)

(*) Notice: Subject to any disclaimer, the term of this patent is extended or adjusted under 35 U.S.C. 154(b) by 196 days.

(21) Appl. No.: 15/059,430

(22) Filed: Mar. 3, 2016

(65) Prior Publication Data

US 2017/0257214 A1  Sep. 7, 2017

(51) Int. Cl.
*G06F 21/00* (2013.01)
*H04L 9/08* (2006.01)
*H04L 29/06* (2006.01)

(52) U.S. Cl.
CPC ........... *H04L 9/0891* (2013.01); *H04L 9/083* (2013.01); *H04L 9/088* (2013.01); *H04L 9/0894* (2013.01); *H04L 63/068* (2013.01); *H04L 63/20* (2013.01)

(58) Field of Classification Search
CPC .................................................. H04L 9/0891
USPC ...................................................... 380/279
See application file for complete search history.

(56) References Cited

U.S. PATENT DOCUMENTS

| | | | | |
|---|---|---|---|---|
| 5,915,025 A | * | 6/1999 | Taguchi | G06F 12/145 380/44 |
| 6,041,123 A | * | 3/2000 | Colvin, Sr. | H04L 9/083 713/153 |
| 6,212,280 B1 | * | 4/2001 | Howard, Jr. | G06F 21/602 380/279 |
| 7,903,820 B2 | * | 3/2011 | Waisbard | H04L 9/0643 380/278 |
| 2010/0146582 A1 | | 6/2010 | Jaber et al. | |

* cited by examiner

*Primary Examiner* — Longbit Chai
(74) *Attorney, Agent, or Firm* — Fogarty LLP

(57) ABSTRACT

In some embodiments, a method may include: enforcing a key rotation policy associated with a current encryption key being used to encrypt and decrypt data stored in an IHS; monitoring a cryptoperiod associated with the current encryption key; in response to a determination that the current encryption key has reached the end of the cryptoperiod, automatically transmitting a request to a key provider for a new encryption key; and in response to the request, automatically: receiving the new encryption key, marking the current encryption key as old, un-encrypting the data using the old encryption key, re-encrypting the data using the new encryption key, and, in response to a determination that all of the data has been re-encrypted with the new encryption key, transmitting a request to the key provider that the old encryption key be discarded, and deleting a local copy of the old encryption key.

20 Claims, 5 Drawing Sheets

ENCRYPTION KEY LIFECYCLE MANAGEMENT

FIELD

This disclosure relates generally to Information Handling Systems (IHSs), and more specifically, to encryption key lifecycle management.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Traditional encryption management is handled on an ad hoc basis. Operating systems and third-party drivers allow a user to encrypt files, folders, or volumes. Some storage devices allow a user to enable encryption of all or a portion of the device. Some applications support or can be extended to support data encryption.

SUMMARY

Embodiments of systems and methods for encryption key lifecycle management are described herein. In an illustrative, non-limiting embodiment, a method may include: enforcing a key rotation policy associated with a current encryption key being used to encrypt and decrypt data stored in an Information Handling System (IHS); monitoring a cryptoperiod associated with the current encryption key; in response to a determination that the current encryption key has reached the end of the cryptoperiod, automatically transmitting a request to a key provider for a new encryption key; and in response to the request, automatically: receiving the new encryption key, marking the current encryption key as old, un-encrypting the data using the old encryption key, re-encrypting the data using the new encryption key, and, in response to a determination that all of the data has been re-encrypted with the new encryption key, transmitting a request to the key provider that the old encryption key be discarded, and deleting a local copy of the old encryption key.

In some embodiments, the receiving, marking, un-encrypting, re-encrypting operations may be performed as background tasks. The un-encrypting and re-encrypting operations may be performed concurrently.

The method may also include requesting that the old encryption key be moved from a backup state to an archived state upon receipt of the new encryption key. The method may further include upon receiving the new encryption key, storing the new encryption key in an backup state. The method may also include marking the new encryption key as active by setting an activation date attribute associated with the new encryption key. The method may further include setting a rotation attribute associated with the new key to true.

In some cases, the request for the new key may start running a new cryptoperiod for the new key. The method may also include decrypting existing data with the old encryption key and encrypting newly created data with the new encryption key. The method may further include marking the new encryption key as active by setting an activation date attribute associated with the new encryption key.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
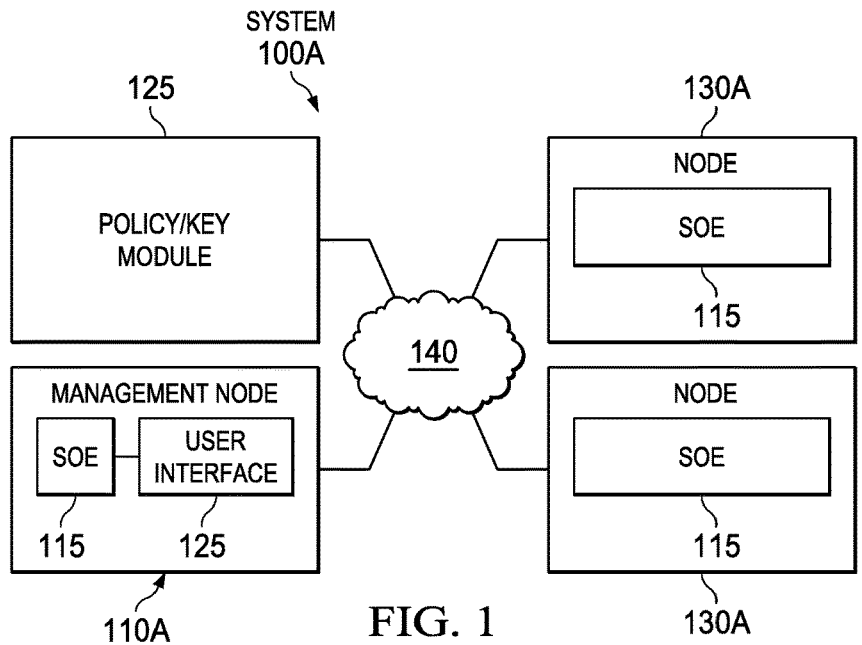
FIG. 1 is a block diagram of an example of a system for providing encryption key lifecycle management across a network, according to some embodiments.

In various embodiments, systems and methods described herein may add logic to an endpoint to automatically implement a key rotation policy based on when key was initially deployed. For example, techniques may be employed as a background tasks to: request a new key from a key manager server upon expiration of a cryptoperiod, un-encrypt and re-encrypt a storage medium, and managing key pointers during re-keying process. Upon success, these techniques may generate a re-key notification or request back to the key manager server that the original key state be changed to archived, or that the key be destroyed. An alternative to the automatic re-keying operation may include notifying the policy administrator that a re-key process be initiated or take no action at all.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, a network router, a network video camera, a data recording device used to record physical measurements in a manufacturing environment, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic stripes, mechanically or optically read punched cards, or radio frequency identification tags.

Still for purposes of this disclosure, a security policy is a computer representation of at least one rule to be satisfied when a request is made for access to a computing resource. For example, a user could be required to enter a password when requesting access to a computer terminal. An encryption policy is one type of security policy addressing the encryption, decryption and/or digital signing of data. An encryption policy may be a subclass of a security policy object class or may simply be a label used to discuss a security policy that addresses the encryption or decryption of data. Where an encryption policy is discussed, it may be a separate and distinct data structure, or it be embodied in a more general security policy data structure.

Each computing resource to which a security policy applies (e.g., to access the computing resource) may be one or more classes of data or one or more specific data elements. A class of data may be, for example, a file type, a physical or logical storage type (e.g., data on a laptop drive; data on removable media; data transmitted across a public network), or a category of data defined explicitly (e.g., classified or top secret data; customer data; financial data; or engineering data). This classification may be specified within the data element, may be implicit, or may be specified by an external list, rule or other mechanism.

A security policy may include one or more rules to be satisfied in the alternative, in conjunction, or by applying a more complex logical test (e.g., A and B or C but never D). In some embodiments, a security policy is a global rule requiring all data to be encrypted prior to storage. In others, multiple encryption policies specify different rules for different classes of data. For example, a security policy may specify that personal data is scrambled using a ROT13 algorithm to prevent inadvertent access, while corporate data is encrypted with one of two allowable encryption algorithms using an encryption key provided in part on a smart card or key fob and provided in part by a key server after proper authentication. Specific data may refer to a particular file, file folder, or data record, for example.

In some embodiments, a security policy may include temporal specifications to indicate when the policy should be enforced. In some embodiments a security policy may include one or more enabling or disabling trigger events, e.g., the addition or removal of a certain hardware or software resource; an idle timer; a panic mode activation; or physical movement of the information handling system. When a security policy applicable to certain data changes (through activation or deactivation), the system may be required to automatically perform some operation on that data.

In some embodiments, a key source may provide an encryption key or may provide a base for determining a key. An example of the latter is a solution to a Diffie-Hellman problem of establishing encryption keys for sharing data between two nodes (e.g., managed node 130A and policy/key module 125). The key source may provide a public key that may be used in combination with a locally stored private key to generate the encryption key used by a security operating environment (e.g., SOE 115). In some embodiments, a key source may provide a symmetric key, which may be encapsulated for transition.

Each key may include one or more attributes, discussed in more detail below. As used herein, the term "key," "encryption key," or "cryptographic key" refers to a parameter used in conjunction with a cryptographic algorithm that determines its operation in such a way that an entity with knowledge of the key can reproduce or reverse the operation, while an entity without knowledge of the key cannot. The term "cryptoperiod" refers to the time span during which a specific key is authorized for use or in which the keys for a given system or application may remain in effect. Generally speaking, before the cryptoperiod of a key expires, that key is stored in a backup state, which includes a copy of information to facilitate recovery during the cryptoperiod of the key. After the cryptoperiod of that key expires and a successful re-key operation has been completed, however, that information is moved into long-term storage as the key state change is being administered.

Figure 2:
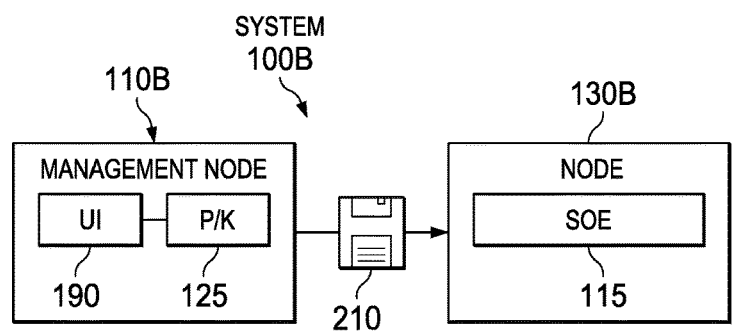
FIG. 2 is a block diagram of an example of a system for providing encryption key lifecycle management without the use of a network, according to some embodiments.
Figure 3:
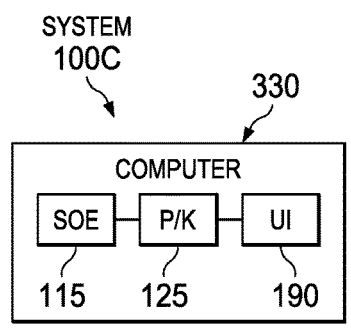
FIG. 3 is a block diagram of an example of a system for providing encryption key lifecycle management in a single Information Handling System (IHS), according to some embodiments.

FIGS. 1-3 illustrate three example systems 100A-C for managing encryption key lifecycles for one or more IHSs, according to some embodiments. In general, system 100A shown in FIG. 1 includes management node 110A that manages encryption key lifecycles for one or more managed nodes 130A via network 140. System 100B shown in FIG. 2 illustrates management node 110B that manages encryption key lifecycles for one or more managed nodes 130B by transferring data using removable computer readable media 210. System 100C shown in FIG. 3 illustrates IHS 110C wherein encryption key lifecycles are managed internally within single node 330. This disclosure also covers hybrids of the three example systems 100A-C, for example, wherein managed security policies are distributed to managed nodes via network 140 to managed nodes 130A and via removable media 210 to managed node 130B. Another hybrid includes node 330 where one or more security policies are received via network 140 and/or removable media 210, but otherwise encryption key lifecycles are managed locally.

FIG. 1 illustrates system 100A for managing security policies across a network. System 100A may include management node 110A, policy/key module 125, and one or more managed nodes 130A. Management node 110A may be communicatively coupled to managed node(s) 130A via network 140. In some embodiments, policy/key management module 125 may be separate from management node 110A and connected to management node 110A via network 140. In other embodiments, policy/key management module 125 may be included in management node 110A. In some embodiments, multiple managed nodes 130A may be configured identically, and in other embodiments they may have different hardware, software, and/or firmware components or may be classified differently (e.g., for use only within a corporate campus versus allowed to travel in public areas).

Management node 110A enables an administrative user to create, modify, delete, and/or otherwise manage security policies for distribution to managed nodes 130A, for example, via network 140. Management node 110A may include a security operating environment ("SOE") 115 configured to enforce security policies on management node 110A, and user interface 190 for managing security policies for local enforcement and/or for distribution.

In some embodiments, clients 130A generally communicate to the policy server, 125, rather than the console 110A. Policies are set in 110A and pushed to policy/key module 125, from which client agents 130A obtain the policy settings.

SEO 115 may include a security policy manager ("SPM") configured to provide standardized policy enforcement and one or more services modules (e.g., services modules 455) configured to discover and/or provide access to various hardware, software and/or firmware modules that implement all or part of services requested by the SPM. These available implementation modules (e.g., implementation modules 465, discussed later) may include one or more encryption implementation modules configured to implement one or more encryption algorithms. The various components of SOE 115 are discussed in more detail with reference to FIG. 4.

User interface 190 is generally configured for providing one or more interfaces allowing an administrative user to create, modify, delete, categorize, organize, and/or otherwise manage security policies (e.g., encryption policies) for managed nodes 130A. User interface 190 may comprise an implementation of the WS-Management standard (e.g., Windows Remote Management) or any other system management interface or application. In some embodiments, user interface 190 may comprise a web server or other server technology to enable a user to manage security policies remotely or locally using a standard web browser or other thin client interface. In some embodiments, user interface 190 may provide a version control system for managing security policy details. In some embodiments, user interface 190 may enable a user to manage other activation and deactivation triggers for particular security policies—e.g., an expiration date and/or time for remotely managed policies and/or local copies of encryption keys. Also, in some embodiments, user interface 190 may correspond to a generalized management system (e.g., Systems Management 495) of node 110A configured to communicate with SOE 115.

In system 100A, policy/key module 125 is generally configured to provide persistent storage of security policies for access by and/or distribution to managed nodes 130A. Policy/key module 125 may also store encryption keys for use by SOE 115 on management node 110A or managed nodes 130A. Policy/key module 125 may reside on a server, workstation, network attached storage device, or other IHS and includes or has access to computer readable media. The persistent data may be in a database, in one or more files (e.g., in XML format) in one or more folders, and/or in a version control system.

Each managed node 130A is generally configured to perform one or more tasks that will produce and/or consume data, at least some of which is governed by a security policy. Examples of such tasks include using a word processor to create, view, modify and/or save a document on the hard drive of a managed node 130A; accessing electronic mail on a managed node 130A over network 140; and/or streaming digital video data from a camera to a managed node 130B. Each managed node 130A includes SOE 115 configured to enforce a relevant security policy. SOE 115 of each managed node 130A may be the same or different than SOE 115 of other managed nodes 130A. In addition, SOE 115 of a managed node 130A may be the same or different than SOE 115 of management node 100A.

In system 100A, each managed node 130A may receive security policies from policy/key module 125 via network 140. Alternatively, managed node 130A may maintain a fixed, or updatable, library of security policies, and may receive instructions from policy/key module 125 to activate or deactivate one or more security policies from the library.

In some embodiments, managed nodes 130A in system 100A may be heterogeneous. For example, some managed nodes 130A may be thin-client systems running a lightweight operating system without any specialized hardware configured to implement security policies while other managed nodes 130A may be state-of-the-art engineering workstations incorporating a general purpose hardware encryption engine, a hard drive with full disk encryption, secure firmware and a trusted platform module.

Additionally, managed node 130A may include a dedicated network attached video camera and/or a process data recording devices. Indeed, certain embodiments specifically address this heterogeneous environment by abstracting out the various hardware, software and/or firmware implementations, as well as by abstracting out the types of data to be protected to allow the specification of generalized security policies. For example, this generalization may allow for a type of rule that requires hardware encryption while SOE 115 is entrusted to discover and apply the available hardware encryption options available on managed node 130A (here, selecting between the general purpose encryption engine and the hard drive with hardware encryption).

In other embodiments, managed nodes 130A in system 100A may be homogeneous. For example, all managed nodes 130A may have substantially identical hardware, software and/or firmware capabilities as they relate to implementing security policies. Thus, system 100A may be used for managing the security of any collection of heterogeneous or homogeneous IHSs.

Management node 110A and managed nodes 130A may comprise any type of IHSs. For example, one or more of management node 110A and managed nodes 130A may comprise servers, personal computers, mobile computing devices (e.g., laptops or PDAs) or any other types of IHSs.

In some embodiments of system 100A, management node 110 may be a physically secure computer system. Other embodiments may allow remote or distributed management of security policies at a management node 110 (e.g., using a laptop, handheld device, or internet browser), but may require securely authenticated and encrypted access.

Network 140 may be a network and/or fabric configured to couple management node 110A to managed nodes 130A. Network 140 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data), or any combination thereof. Network 140 may transmit data using wireless transmissions and/or wire-line transmissions via any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 140 and its various components may be implemented using hardware, software, or any combination thereof.

In operation, a user's identity may first be authenticated at managed node 190, for example, by way of entry of a username and a password. The user may then access user interface 190 by launching an application or browsing to a specific web page. User interface 190 may include a graphical user interface (GUI) for managing security policies or may provide a text-based interface. In certain embodiments, the user may use Microsoft WS-Management to access the policy/key module 125. User interface 190 may provide various views allowing a user to search for existing security policies based on classifications of data, level of security, and/or other factors. User interface 190 may allow the user to "right-click" to edit an existing policy or may provide some other mechanism for doing so. In some embodiments, active security policies may only be set to expire via user interface 190 and may not be deleted or modified; this maintains a clear history and audit trail.

Within user interface 190, a user creates a new security policy by selecting a "new security policy" option from a menu, clicking on a button, typing a command, or via any other user input method. The user may then set various parameters for the security policy—e.g., a unique identifier, a record of which user created it and when, one or more requirements for platform services, one or more requirements for authentication services, one or more requirements for encryption services, a specification of associated data, a start date/time, an end date/time, a specification of another type of triggering event that would enable or disable the new policy, and/or an action to take in the event that the policy cannot be enforced (e.g., secure deletion of or denial of access to any associated data). A user may specify requirements for platform, authentication, and/or encryption services as a general requirement (e.g., a minimum level of encryption) or as a specific requirement (e.g., full disk encryption or an encryption enabled chipset). A user may categorize this new security policy or otherwise specify its relationship to other security policies. This categorization may be in addition to or in place of an objective categorization scheme keying off of fields in the policy itself, e.g., triggering event or temporal information.

User interface 190 may link to or incorporate workflow technology to require approvals by certain individuals or one or more members of an identified group of approvers. Once the new or modified security policy ("new policy") has been approved by the entering user or by any required approvers, the new policy may be available for use by SOE 115 on managed node. 130A.

FIG. 2 illustrates a system 100B for managing security policies without the use of a network, according to certain embodiments of the present disclosure. System 100B may include a management node 110B, and one or more managed nodes 130B. In some embodiments, system 100B may differ from system 100A of FIG. 1 in that management node 110B may not include SOE 115.

Management node 110B generally enables an administrative user to create, modify, delete, and/or otherwise manage security policies for distribution to managed nodes 130B, for example, via removable media 210. Management node 110B may include a user interface 190 for managing security policies, stored in policy/key module 125, for local enforcement and/or for distribution. Management node 110B also includes a drive, port or other interface for writing to (and possibly reading from) removable media 210.

Like managed nodes 130A of system 100A in FIG. 1, each managed node 130B of system 100B is generally configured to perform one or more tasks that will produce and/or consume data, at least some of which is governed by a security policy. Each managed node 130B includes SOE 115 configured to enforce any relevant security policy. SOE 115 of each different managed node 130B may be the same or different than SOE 115 of other managed nodes 130B. In addition, SOE 115 of a managed node 130B may be the same or different than SOE 115 of management node 110A.

Managed nodes 130B also include a drive, port or other interface for reading from removable media 210. In some embodiments, write access to removable media 210 may be required if an enforcement verification record, or other audit information, must be returned to management node 110B. As with managed nodes 130A, managed nodes 130B may be any kind of IHS and may have identical hardware configurations to any other managed nodes 130B or may have varied configurations.

In system 100B, each managed node 130B may receive security policies from policy/key module 125 via removable media 210. Alternatively, managed node 130B may maintain a fixed, or updatable, library of security policies, and may receive instructions from removable media 210 to activate or deactivate one or more security policies from such library. In alternative embodiments, management node 110B may also interface with a network to communicate policies to a policy/key module 125 operating remote from management node 110B. Furthermore, in some embodiments, a managed node 130B may be configured to access a policy/key module 125 both via a network and via removable media 210, enabling a fail over or an additional policy and key distribution system where a connection to the network is not secure or reliable. In some embodiments, management node 110B may receive security policies from removable media 210.

FIG. 3 illustrates system 100C for managing security policies in a single information handling system node 330, according to certain embodiments. System 100C may include user interface 190, SOE 115, and policy/key module 125. Policy/key module 125 may store the security policies as files (e.g., XML files) on local storage media of node 330. In some embodiments, this configuration may be employed by a user in administering her own computer in situations where personal data security is a concern, but where node 330 is not part of a network of managed collection of information handling systems. In some embodiments, user interface 190 may comprise an option on system install or may allow the user to select from one or more predefined security policy options. In some embodiments, user interface 190 may be integrated into the operating system such that the properties dialog on a folder or file offers a security policy selection interface.

In some embodiments, node 330 may also receive one or more security policy from removable media 210 or from policy/key module 125 via network 140. For example, an independent contractor may import a security policy established by his client in order to access that client's data on his own laptop. For other data, the contractor would continue to use any existing security policies.

Figure 4:
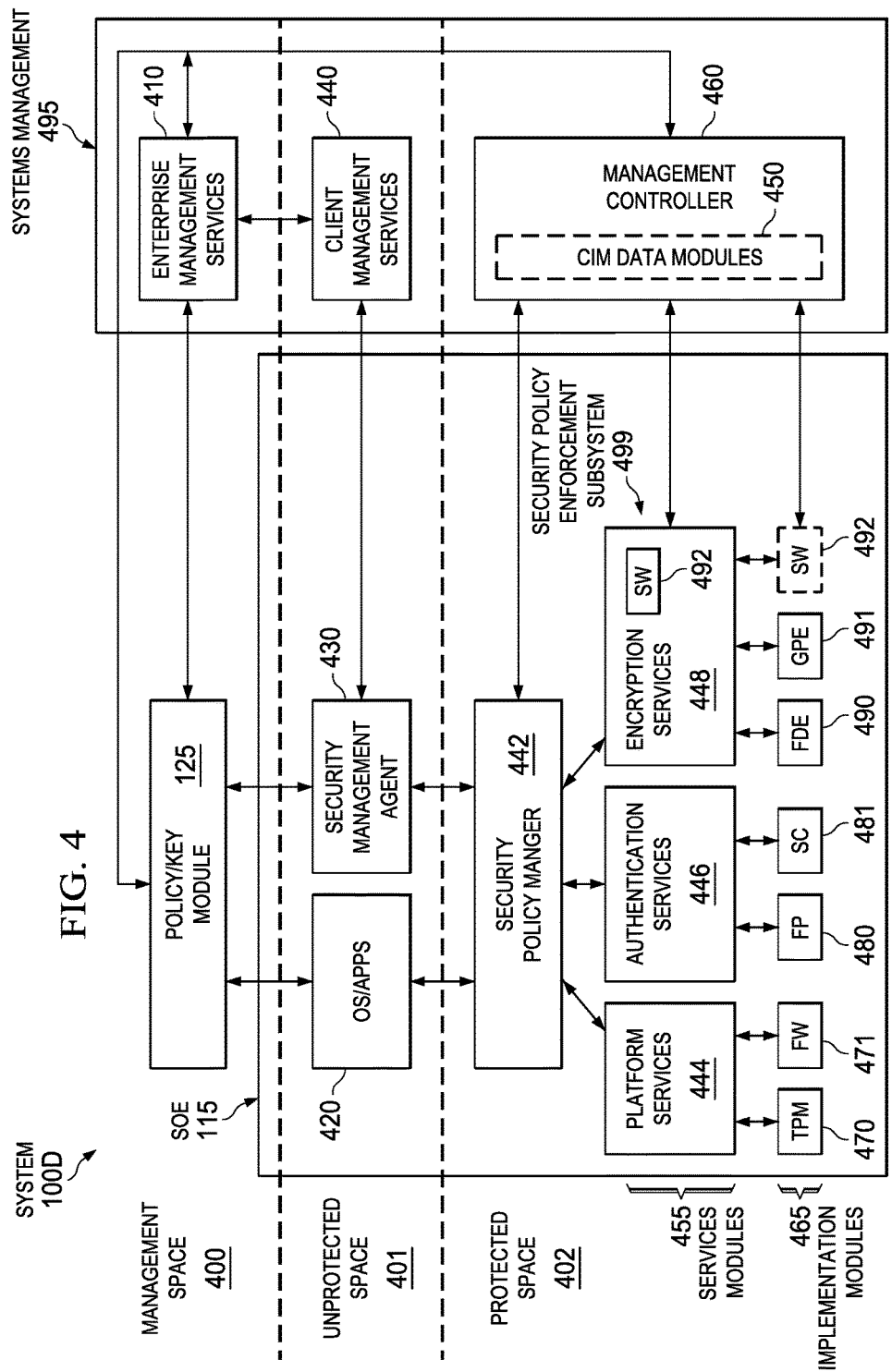
FIG. 4 is a block diagram of an example of components of the systems shown in FIGS. 1-3 according to some embodiments.

FIG. 4 illustrates system 100D for managing security policies, according to certain embodiments. System 100D may include policy/key module 125, systems management 495, and SOE 115. In some embodiments, system 100D may correspond to any of the deployment scenarios illustrated in systems 100A, 100B, and 100C. For example, SOE 115 of system 100D may correspond to SOE 115 of system 100B in managed node 130B. As another example, systems management 495 of system 100D may correspond to systems management 495 of system 100A in management node 110A.

System 100D may be viewed as segmented into three interconnected spaces including management space 400, unprotected space 401, and protected space 402. Management space 400 may provide centralized or concentrated enterprise-wide management of policies, keys, and/or any other system information or rules. Unprotected space 401 may include operating system/applications 420 and security management agent 430, which have access to unencrypted data and may be producers and/or consumers of data to be encrypted/decrypted en route to a storage media or communications device. Protected space 402 may include various hardware, software, and/or firmware services for enforcing and implementing security policies. These services may be provided through one or more abstraction layers.

Management space 400 enables centralized or concentrated enterprise management of system 100D. Management space 400 may include policy/key module 125 and enterprise management services 410. Policy/key module 125 may provide centralized data storage of security policies and/or encryption keys and provide push or pull distribution of the same. Enterprise management services 410 may provide centralized management of security policies and encryption keys by one or more trusted users for persistence in and distribution by policy/key module 125.

Enterprise management services 410 generally enables trusted users to create, modify, delete, organize, enable, disable and/or expire security policies and/or encryption keys. In some embodiments, enterprise management services 410 may be an implementation of the WS-Management standard for system management or may be one of a number of proprietary management frameworks. Enterprise management services 410 may be a traditional client/server application interfacing with policy/key module 125 (and/or management controller 460), or it may be a SOAP-based thin client application framework. The interface may be text-based or graphical and may provide management functionality in the form of wizards, hierarchical editors, property sheets, and/or table views. Enterprise management services 410 may reside on one or more information handling systems—e.g., a laptop, workstation, server, PDA, thin-client terminal, and/or ASCII terminal.

Unprotected space 401 generally enables the production, consumption and/or manipulation of protected data in an unencrypted form. Unprotected space 401 may include operating system/applications 420 and/or security management agent 430, either or both of which may be part of SOE 115 and therefore operate on management node 110A or managed node 130A of system 100A; managed node 130B of system 110B; or node 330 of system 100C. Unprotected space 401 may also include client management services 440, which may reside on the same node as SOE 115 or on a dedicated management node. Client management services 440 may reside on the same information handling system as enterprise management services 410.

Operating system/applications 420 generally enables a user to access, view, create, manipulate, organize, and/or delete data associated with one or more security policies. Operating system/applications 420 may include Microsoft Windows, Linux, or any other operating system and may include an office applications suite, graphics editing software, database applications, electronic mail applications, web browsers, or any other application accessed by an end-user of an IHS. Operating system/applications 420 may also include autonomous software—e.g., video recording software, audio broadcast or multicast encoders and/or decoders, environmental data collection and processing applications and on-line control systems. These software modules may be aware of protected space 402 and security policies and implementation, or may be unaware and rely on some other software module to interact with protected space 402.

Protected space 402 generally facilitates the implementation of the security policies through one or more abstraction layers. Protected space 402 may include security policy manager 442, one or more services modules 455, common information model ("CIM") data models 450, management controller 460, and/or implementation modules 465. Security policy enforcement subsystem 499 generally describes one or more modules in the protected space 402 portion of SOE 115. In some embodiments, protected space 402 provides an application programming interface ("API") to unprotected space 401 allowing the computing resources and services in unprotected space 401 to perform such tasks as encryption, decryption, digital signing, encryption key storage/access, and/or authentication. In some embodiments, this API allows access to a specific software, hardware and/or firmware implementation module 465. In some embodiments, the API provides a complete abstraction precluding any need for awareness by unprotected space 401 of details relating to the implementation of a requested service or resource.

The one or more services modules 455 may include platform services 444, authentication services 446, and/or encryption services 448, each of which is generally enabled to discover available implementation modules 465 and to connect implementation modules 465 to security policy manager 442 with or without an intervening abstraction interface. Each service module 455 may be implemented with middleware, dynamic linking, or any other appropriate software, hardware and/or firmware technology. In some embodiments, a service module may initiate a discovery routine to look for all available hardware, software and/or firmware components capable of implementing one or more of a specific set of services. This discovery may be based on a common naming scheme, an industry standard model number coding scheme, an updatable list of candidates to search for, or any other discovery mechanism. In some embodiments, a record or object may be created for each implementation module 465 indicating the properties of and/or services performed by that module.

Platform services 444 are generally enabled to provide secure key storage and access within an IHS. Platform services 444 may include trusted platform module (TPM) 470 and/or secure firmware (FW) 471. Trusted platform module 470 may be a hardware subsystem for storing one or more encryption keys inaccessible by the operating system and any applications. One of these encryption keys may be communicated across the system bus to a specific hardware-based encryption implementation module (e.g., general purpose encryption engine 491).

Secure firmware 471 may provide similar key protection using firmware rather than a dedicated hardware module. In some embodiments, the key is not transmitted in clear text, but is encapsulated using asymmetric (or public-key) cryptography whenever the key is transmitted in the system. For example, when a corporate standard key is retrieved from policy/key module 125 for storage in trusted platform module 470, that corporate key is first encrypted by policy/key module 125 using the public key of trusted platform module 470. When the corporate key arrives at trusted platform module 470, it is stored in hardware inaccessible by the operating system or applications. When that corporate key is needed by an encryption implementation module (e.g., general purpose encryption 491), trusted platform module 470 may decrypt the corporate key using the module's private key and encrypt the corporate key using the general purpose encryption module 491's public key. Finally, general purpose encryption module 491 uses its own private key to decrypt the corporate key and use it to encrypt or decrypt data as requested.

Authentication services 446 are generally enabled to provide trustworthy authentication of a user or system using inputs other than a memorized pass code or phrase. Authentication services 446 may include fingerprint reader (FP) 480, smartcard reader (SC) 481, other biometric sensors and/or secure token generators. User authentication schemes typically rely on what a user knows (e.g., a password), what a user has (e.g., smartcard 481), and/or what a user "is" (e.g., biometric sensors, fingerprint reader 480 or a retinal scanner). In some embodiments, a combination of two or more of these elements may be used to provide additional resistance against certain security risks.

Encryption services 448 are generally enabled to encrypt, decrypt and/or digitally sign data. Encryption services may include full disk encryption (FDE) 490, hardware cryptography acceleration (GPE) 491, and/or software encryption (SW) 492. In some embodiments, encryption services 448 accepts a request comprising an encryption algorithm, required key strength, an optional requirement that implementation module 465 implement the algorithm on specialized hardware, an encryption key, and/or an encryption key source.

Encryption services 448 may also determine performance characteristics in order to compare and/or rank available encryption implementation modules 465 on efficiency, security, or other criteria. In terms of efficiency, encryption implementation modules 465 may be ranked by overall throughput (e.g., bytes encrypted per second) or latency (e.g., time to encrypt the first byte or time to encrypt a specified block of data) in implementing various encryption algorithms. Efficiency may also be determined as a function of power consumed per byte of data encrypted or decrypted. Encryption services 448 may then use this comparative analysis and/or ranking to determine which implementation encryption module 465 should be used to implement an encryption request.

Full disk encryption 490 is generally enabled to provide hardware encryption of data as it is written to a disk thus protecting data from unauthorized access even if the disk is physically removed from the IHS and connected to another system. FDE 490 generally operates to encrypt all data stored using a specified encryption key.

GPE 491 is generally enabled to provide hardware-based cryptographic services for use by any application, process and/or operating system. GPE 491 may be integrated with trusted platform module 470 in a chipset or single chip, or may be provided as an external module. More than one GPE 491 implementation modules may exist within or directly interfaced with a given IHS. General purpose encryption 491 may allow the selection of an algorithm, key strength, key source, data source, and/or destination.

SW 492 is generally enabled to provide software encryption using one or more encryption algorithms for use by any application, process and/or operating system. Software encryption 492 may be integrated with encryption services 448 or supplied as one or more additional software modules. In some embodiments, software encryption 492 is a fallback implementation to be used when allowed by a given security policy, but only when a hardware implementation is not available. In some embodiments, software encryption module 492 is completely disabled. In some embodiments, software encryption module 492 provides a base level of data protection for information handling systems that do not have any hardware-based encryption support.

CIM data models 450 are generally defined to provide targeted, or lower-level management of components in an information handling system. CIM is an example of an industry standard way to define management objects, but other approaches may also be used. These models may be used to configure and/or manage the configurations of security policy manager 442, services modules 455, and/or implementation modules 465. In some embodiments, CIM data models 450 specify the possible and/or allowable implementation modules 465 using a protocol—e.g., SNMP. In some embodiments, CIM data models 450 may establish security policies outright, especially for embedded or autonomous information handling systems—e.g., process data collection systems or remote video capture devices. CIM data models 450 may also be used to query the system in order to discover available services modules 455 and/or implementation modules 465 and the capabilities of each.

Management controller 460 is generally enabled to process CIM data models 450 that are managed in a centralized or concentrated fashion. In some embodiments, management controller 460 may be an implementation of one or more components of a standard web-based enterprise management (WBEM)—e.g., CIM-XML, CIM operations over HTTP or WS-Management.

During operation of the systems described in FIGS. 1-4 above, encryption security policies may require that keys be changed or renewed after a predetermined period of time. As may be inferred from foregoing discussion, however, encryption key management is a difficult problem. Encryption key lifecycle management is even more difficult, because it involves multiple key management within a data decrypt and re-encrypt cycle without loss of data, and new key and current key management and security compliance are all involved.

To address these problems, systems and methods described herein enable a re-keying process to be performed in the background without management or user interface while maintaining data security and compliance. In some embodiments, the systems and methods described herein may employ a policy-driven background encryption algorithm supported by and in support of key server managed keys to implement a NIST 800-57 recommended symmetric data encryption key lifecycle (end-of-life) cryptoperiod key rotation.

In some embodiments, upon instantiation of a security policy that requires platform user data encryption, an additional policy may be applied to the encryption key for key lifecycle management. The key lifecycle management policy governs the action(s) to be taken when the key used in the data encryption reaches the end of its cryptoperiod. At the end of the useful cryptoperiod, the policy enables one of three actions to be taken: 1) the encrypted data is re-keyed with a new key; 2) a notification is sent to the policy owner in which the owner or responsible administrator is notified the key's cryptoperiod has expired and a discretionary action is to be undertaken; or 3) no action is to be taken.

If the policy requires the data to be re-keyed, the implementation requests from the key management agent a new encryption key. The policy requests the current key be moved from a backup state to an archived state. The new key is automatically stored in a backup key lifecycle management state. When a re-key key has been received and locally protected properly, but before the actual encryption process begins, the policy requests the key management agent mark the key as active by requesting the activation date attribute be set.

When successful, the policy causes the re-key encryption logic to begin un-encrypting and re-encrypting the data encrypted using the current ("old") key for un-encrypting and the re-key key ("new") for re-encrypting data. The policy informs the key management agent the current key is in the rotation state of its lifecycle. The request for the "new" key activation date attribute change starts the cryptoperiod for the re-key key. For a file encrypted system, file system pointers may be maintained within the re-key logic that uses the correct encryption key for system open file requests and will automatically encrypt newly created files using the new key.

When the re-encryption task has been completed, the re-key logic will request the key management agent notify the key server that the "old" key object and the activation date attribute are to be destroyed and that the "new" key is to be recorded as the current key with proper key lifecycle management regarding monitoring and deployment. The local copy of the "old" encryption key is destroyed. In some cases, the "old" key may be archived for some period of time in case a situation arises where that key may need to be recovered. Nonetheless, the "old" key may be marked inactive so that nothing can be encrypted using an expired key.

The re-key activity may take place in the background and no user notification is required. Notification of the system's entry into the re-key logic may be sent to the system administrator for monitoring purposes.

Conversely, the policy requires only a notification of the key's expired cryptoperiod, the notification event is sent to the agent to be notified and then waits for further policy direction from the responsible manager or administrator. Note that no further action is a valid direction from the administrator. In this event, the policy behavior is implementation specific.

On the other hand, if no action is to be taken, the policy makes no changes and issues no notifications. This does not imply that no notification happens at all, however, because it may occur within the key management service logic, data store logic, or administrator console notifications and events logic. Additional actions may be taken as directed by the administrator.

Figures 5, 6:
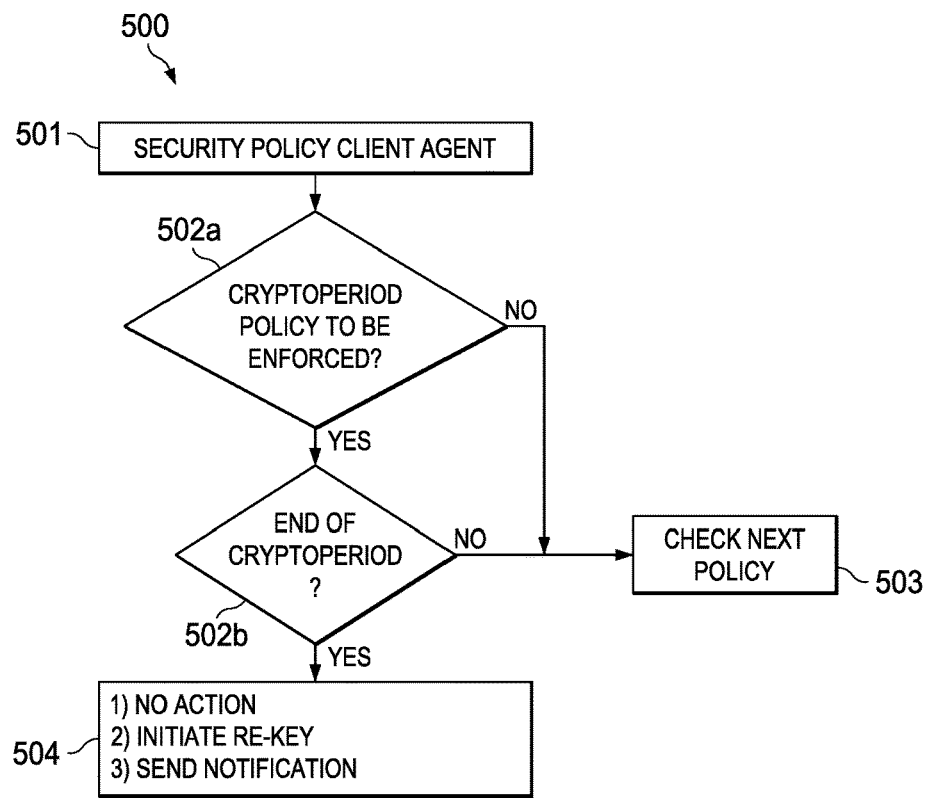
FIG. 5 is a flowchart of a method for providing encryption key lifecycle management according to some embodiments.
FIG. 6 is a flowchart of a method for encryption key rotation according to some embodiments.

FIG. 5 is a flowchart of a method for providing encryption key lifecycle management. In some embodiments, method 500 may be performed, at least in part, by a security policy client agent. As shown, at block 501, method 500 includes identifying a security policy by a security policy client agent. At block 502*a*, method 500 determines whether a cryptoperiod or key rotation policy is to be enforced. For example, the security policy identified in block 501 may include a cryptoperiod or key rotation policy which requires that, at the end of a cryptoperiod, a key be rotated such that a new key is issued and a current key is retired. If a cryptoperiod or key rotation policy does not exist within the security policy, block 503 identifies, selects, and/or checks a next security policy. Otherwise, at block 502*b*, the client agent monitors the cryptoperiod of the current key. If the end of the cryptoperiod has not yet been reached, again block 503 identifies, selects, and/or checks a next security policy. When the end of the cryptoperiod is reached, however, control passes to block 504.

At block 504 the identified cryptoperiod or key rotation policy may determine which action to take. In some cases, the policy requires that no action be taken. Alternatively, the policy may require that re-keying or key rotation be performed. Additionally or alternatively, the policy may require notifying an administrator or user.

In sum, if the cryptoperiod is being enforced, it is examined to determine if it has expired (blocks 502 to 503). If it has not expired, the method moves to the next policy and checks it. If it has expired, the method goes on to block 504 and executes the policy.

FIG. 6 is a flowchart of a method for encryption key rotation. In some embodiments, method 600 may be performed, at least in part, by security policy manager 442 of FIG. 4. At block 600, method 600 may request that a new key be issued, for example, by policy key module 125. Once the new key is received, at block 602 method 600 requests that attributes associated with both the new key and the currently used key be changed.

Generally speaking, each key may have a number of attributes associated therewith in the form of metadata. In some embodiments introduced herein, these attributes may include a new rotation attribute that indicates whether the associated key is currently in rotation. In some cases, the newly introduced rotation attribute for both the new key and the current key may be set to "true" at block 602; which indicates that these keys are part of an ongoing re-keying process. In other cases, the rotation attribute for the new key may further indicate that this is the new key in the rotation process, whereas the rotation attribute for the current key may indicate that this is the "old" key in the rotation process. For the period of time during which the rotation or re-keying is taking place, the rotation attribute of a given key allows it to be treated differently during data decryption and (re-) encryption, which provides a number of significant advantages as described herein. For example, use of the newly created rotation attribute enables various fully automatic key rotation processes.

Accordingly, still at block 602, method 600 may further mark the new key as "active" or "new." The current key as may be marked "old" or "revoked" with a reason such as "unspecified," "superseded," or "cessation of operation;" which moves the key state from active to deactivated (but not archived)—that is, the old key is still "in use" but cannot be used for new operations. To that end, block 603 may distinguish the new key from the old key based upon each respective key's inception or creation date, cryptoperiod time that is left, or by an indication in the rotation attribute. In some embodiments, distinguishing keys based upon the rotation attribute may be advantageous, especially when the new and old keys have different cryptoperiods or the same inception or creation date.

At block 603, method 600 may include backing up the new key. As such, the new key is marked as the current key with proper key lifecycle management. To that end, in various embodiments, the cryptoperiod of the new key, which was set upon activation at block 601, is now monitored by block 502 of FIG. 5.

Then, at blocks 604 and 605, method 600 includes un-encrypting data using the old key and re-encrypting that data using the new key. The processes of blocks 604 and 605 may be performed automatically in the background and without user intervention. For example, while the user is operating his or her computer, a first processing thread may perform un-encryption operations while a second thread performs the re-encryption operation. To maintain order through the process, file system pointers may be maintained that use the correct encryption key (that is, the "old" key) for system open file requests, and encrypts newly created files using the new key.

When decryption and re-ecryption blocks 604 and 605 are completed (for example, thereby rotating the encryption key of an entire storage volume or portion thereof), at block 606 method 600 archives the old key, which means that the old key is not knowingly being used and will not be used for new operations. Block 607 destroys or discards the old key upon the end of a security administrator's decision for the time of the archive period.

Figure 7:
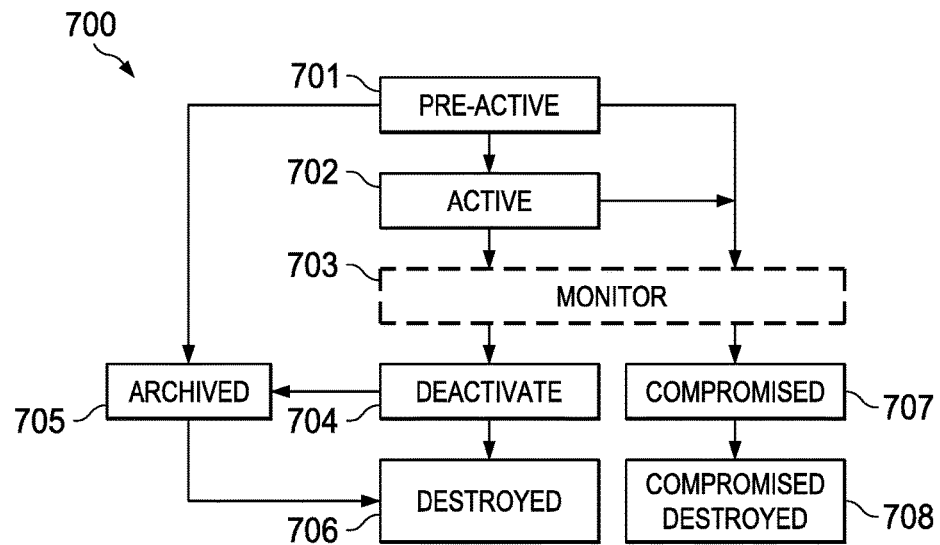
FIG. 7 is a diagram of encryption key states according to some embodiments.

FIG. 7 is a diagram of encryption key states. In some embodiments, blocks 701-708 represent the various states of an encryption key automatically managed by systems and methods described herein. Particularly, at state 701 a newly created key is deemed pre-active. At state 702, the key is active thus marking the start of the key's cryptoperiod. Monitor state 703 corresponds, for example, to block 502 of FIG. 5, where the key's cryptoperiod is monitored, along with other events, such as, for example, any even that may call into question the integrity of the key. If the integrity of the key is compromised, state 707 deems the key compromised. After state 707, the key may be destroyed therefore assuming state 708. When the cryptoperiod expires, state 704 deems the key deactivated. After that, the key may either assumed an archived state 705 or it may be destroyed in to destroyed state. In various embodiments, attributes or metadata associated with a given key may identify the current state of that key to facilitate implementation of the various techniques described herein.

Figure 8:
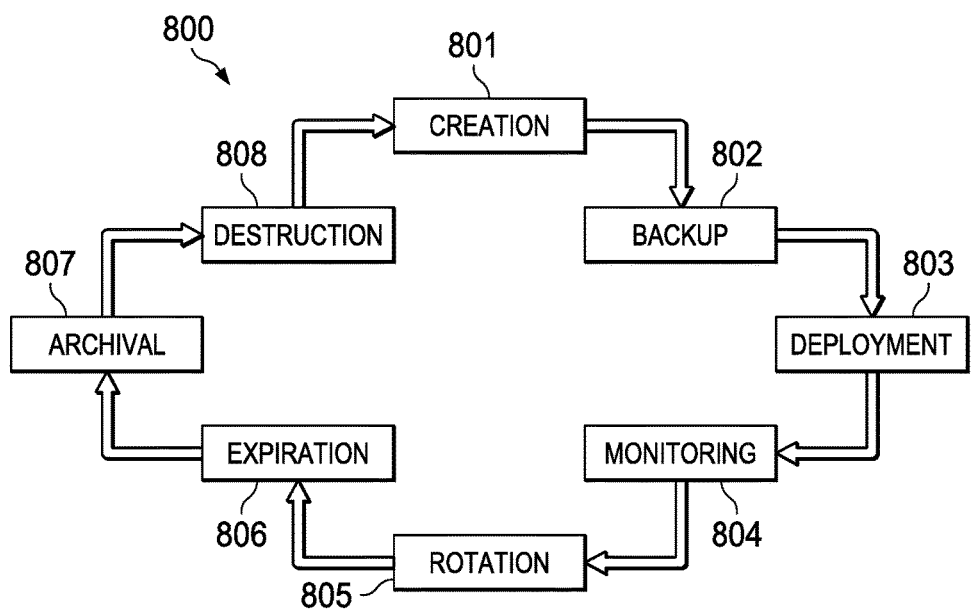
FIG. 8 is a diagram of encryption key lifecycle management states according to some embodiments.

FIG. 8 is a diagram of encryption key lifecycle management stages. In some embodiments, blocks 801-808 represent the various stages in the lifecycle of an encryption key automatically managed by systems and methods described herein. Stage 801 includes creation or activation of an encryption key, which begins running the key's cryptoperiod. Stage 802 backs up the key, which is then deployed at stage 803. The state of the key is monitored at stage 804, which allows key rotation stage 805 to take place. When the cryptoperiod of a key expires, it enters stage 806. The expired key is then archived in stage 807, and later destructed in stage 808. In various embodiments, attributes or metadata associated with a given key may indicate one of stages 801-808 to facilitate implementation of the various techniques described herein.

Figure 9:
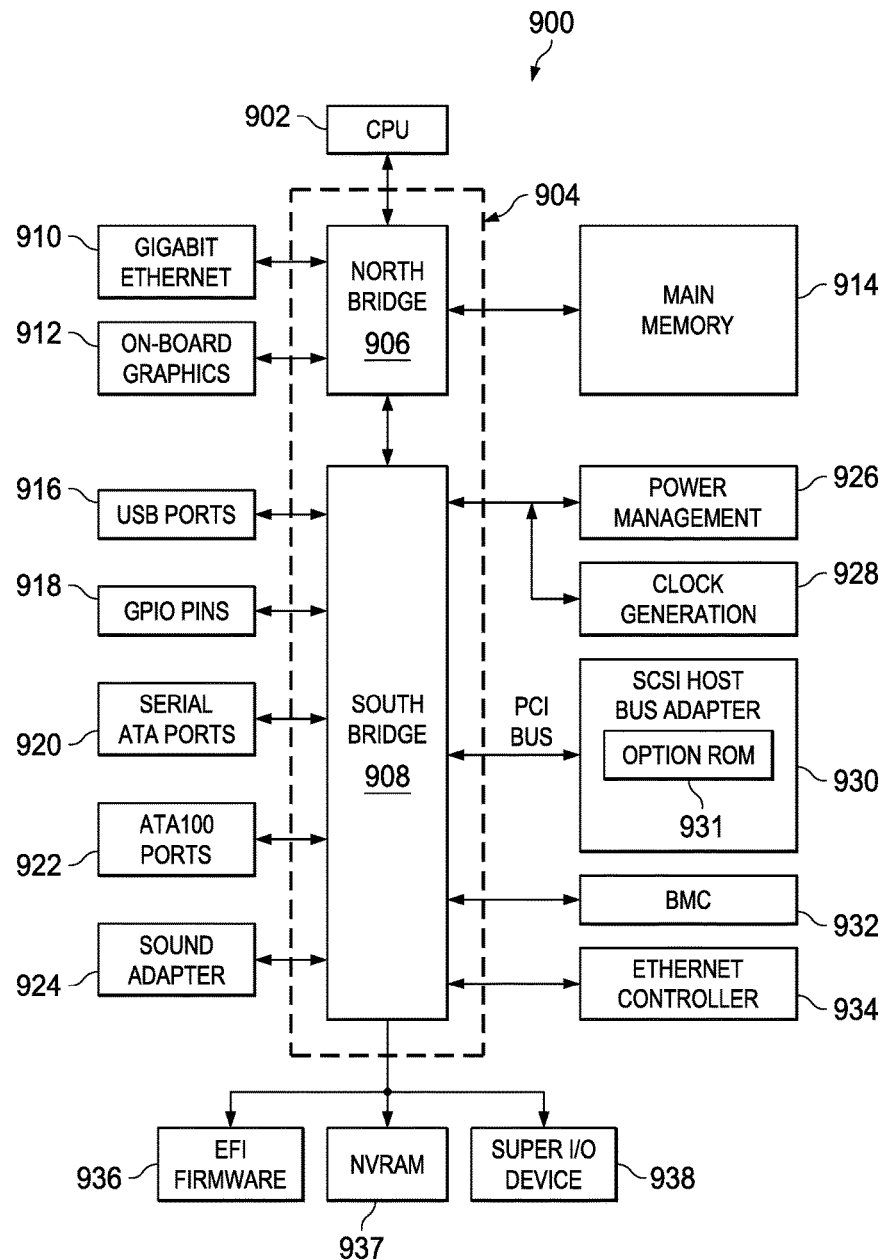
FIG. 9 is a diagram of an example of an IHS configured to implement various systems and methods described herein according to some embodiments.

FIG. 9 shows an example of IHS 900 configured to implement systems and methods described above. It should be appreciated that although certain embodiments described herein may be discussed in the context of a desktop or server computer, other embodiments may be utilized with virtually any type of IHS. Particularly, IHS 900 includes a baseboard or motherboard, which is a printed circuit board (PCB) to which components or devices are coupled by way of a bus or other electrical communication path. For example, central processing unit ("CPU") 902 operates in conjunction with a chipset 904; CPU 902 is a standard central processor that performs arithmetic and logical operations necessary for the operation of IHS 900.

Chipset 904 includes northbridge 906 and southbridge 908. Northbridge 906 provides an interface between CPU 902 and the remainder of IHS 900. Northbridge 906 also provides an interface to a random access memory (RAM) used as main memory 914 in IHS 900 and, possibly, to on-board graphics adapter 912. Northbridge 906 may also be configured to provide networking operations through Ethernet adapter 910. Ethernet adapter 910 is capable of connecting IHS 900 to another IHS (e.g., a remotely located IHS) via a network. Connections which may be made by network adapter 910 may include local area network (LAN) or wide area network (WAN) connections. Northbridge 906 is also coupled to southbridge 908.

Southbridge 908 is responsible for controlling many of the input/output (I/O) operations of IHS 900. In particular, southbridge 908 may provide one or more universal serial bus (USB) ports 916, sound adapter 924, Ethernet controller 934, and one or more general purpose input/output (GPIO) pins 918. Southbridge 908 may also provide a bus for interfacing peripheral card devices such as BIOS boot system-compliant SCSI host bus adapter 930. In some embodiments, the bus may include a peripheral component interconnect (PCI) bus. Southbridge 908 may also provide baseboard management controller (BMC) 932 for use in managing the various components of IHS 900. Power management circuitry 926 and clock generation circuitry 928 may also be utilized during the operation of southbridge 908.

Southbridge 908 is further configured to provide one or more interfaces for connecting mass storage devices to IHS 900. For instance, in an embodiment, southbridge 908 may include a serial advanced technology attachment (SATA) adapter for providing one or more serial ATA ports 920 and/or an ATA100 adapter for providing one or more ATA 100 ports 922. Serial ATA ports 920 and ATA100 ports 922 may be, in turn, connected to one or more mass storage devices storing an operating system (OS) and application programs. An OS comprises a set of programs that control operations of IHS 900 and allocation of resources. An application program is software that runs on top of the OS and uses computer resources made available through the OS to perform application specific tasks desired by the user.

Mass storage devices connected to southbridge 908 and SCSI host bus adapter 930, and their associated computer-readable media provide non-volatile storage for IHS 900. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS 900. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count ("LPC") interface may also be provided by southbridge 908 for connecting Super I/O device 938. Super I/O device 938 is responsible for providing a number of I/O ports, including a keyboard port, a mouse port, a serial interface, a parallel port, and other types of input/output ports. The LPC interface may also connect a computer storage media such as a ROM or a flash memory such as a non-volatile random access memory (NVRAM) for storing firmware 936 that includes program code containing the basic routines that help to start up IHS 900 and to transfer information between elements within IHS 900. EFI firmware 936 comprises a firmware that is compatible with the EFI Specification and the Framework.

The LPC interface may also be utilized to connect NVRAM 937 to IHS 900. NVRAM 937 may be utilized by firmware 936 to store configuration data for IHS 900. In other embodiments, configuration data for IHS 900 may be stored on the same NVRAM 937 as the firmware 936.

BMC 932 may include non-volatile memory having program instructions stored thereon that are usable by CPU(s) 902 to enable remote management of IHS 900. For example, BMC 932 may enable a user to discover, configure, and manage BMC 932, setup configuration options, resolve and administer hardware or software problems, etc. Additionally or alternatively, BMC 932 may include one or more firmware volumes, each volume having one or more firmware files used by the BIOS' firmware interface to initialize and test components of IHS 900.

As a non-limiting example of BMC 932, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within IHS 900 from the factory.

It should be appreciated that, in other embodiments, IHS 900 may comprise other types of computing devices, including hand-held computers, embedded computer systems, personal digital assistants, and other types of computing devices. It is also contemplated that the IHS 900 may not include all of the components shown in FIG. 9, may include other components that are not explicitly shown in FIG. 9, or may utilize an architecture different than that shown in FIG. 9.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    enforcing a key rotation policy associated with a current encryption key being used to encrypt and decrypt data stored in an Information Handling System (IHS);
    monitoring a cryptoperiod associated with the current encryption key;
    in response to a determination that the current encryption key has reached an end of a cryptoperiod, automatically transmitting a request to a key provider for a new encryption key, wherein the new and old encryption keys have: (i) different cryptoperiods, or (b) a common inception or creation date;
    in response to the request, automatically:
    receiving the new encryption key, marking the current encryption key as old, un-encrypting the data using the old encryption key and re-encrypting the data using the new encryption key, wherein the old and new encryption keys are distinguished from each other during the un-encrypting and re-encrypting based upon each key's respective rotation attribute, wherein each rotation attribute is a value distinct from any cryptoperiod such that the new encryption key and the old encryption key can be further distinguished when both of the encryption keys have different cryptoperiods, and wherein each rotation attribute indicates whether a respective encryption key is in rotation; and
    in response to a determination that all of the data has been re-encrypted with the new encryption key, transmitting a request to the key provider that the old encryption key be discarded, and deleting a local copy of the old encryption key.

2. The method of claim 1, wherein the receiving, marking, un-encrypting, re-encrypting operations are performed as background tasks.

3. The method of claim 1, wherein the un-encrypting and re-encrypting operations are performed concurrently.

4. The method of claim 3, further comprising, upon receiving the new encryption key, storing the new encryption key in a backup state.

5. The method of claim 1, further comprising requesting that the old encryption key be moved from a backup state to an archived state upon receipt of the new encryption key.

6. The method of claim 1, further comprising marking the new encryption key as active by setting an activation date attribute associated with the new encryption key.

7. The method of claim 1, further comprising setting a rotation attribute associated with the new key to true.

8. The method of claim 1, wherein the request for the new key starts running a new cryptoperiod for the new key.

9. The method of claim 1, further comprising decrypting existing data with the old encryption key and encrypting newly created data with the new encryption key.

10. The method of claim 1, further comprising marking the new encryption key as active by setting an activation date attribute associated with the new encryption key.

11. A hardware memory device having program instructions stored thereon that, upon execution by a hardware processor, cause the hardware processor to:
monitor a cryptoperiod associated with a current encryption key being used to encrypt and decrypt data stored in an Information Handling System (IHS) coupled to the hardware processor;
in response to a determination that the current encryption key has reached an end of a cryptoperiod, transmit a request to a key provider for a new encryption key, wherein the new and old encryption keys have: (i) different cryptoperiods, or (b) a common inception or creation date;
in response to the request:
receive the new encryption key, mark the current encryption key as old, un-encrypt the data using the old encryption key and re-encrypt the data using the new encryption key, wherein the old and new encryption keys are distinguished from each other during the un-encrypting and re-encrypting based upon each key's respective rotation attribute, wherein each rotation attribute is a value distinct from any cryptoperiod such that the new encryption key and the old encryption key can be further distinguished when both of the encryption keys have different cryptoperiods, and wherein each rotation attributed indicates whether a respective encryption key is in rotation; and
in response to a determination that all of the data has been re-encrypted with the new encryption key, transmit a request to the key provider that the old encryption key be discarded.

12. The hardware memory device of claim 11, wherein the receiving, marking, un-encrypting, re-encrypting operations are performed as background tasks.

13. The hardware memory device of claim 11, wherein the un-encrypting and re-encrypting operations are performed concurrently.

14. The hardware memory device of claim 11, wherein the program instructions are further configured to cause the hardware processor to request that the old encryption key be moved from a backup state to an archived state upon receipt of the new encryption key.

15. The hardware memory device of claim 14, wherein the program instructions are further configured to cause the hardware processor to, upon receipt of the new encryption key, store the new encryption key in a backup state.

16. The hardware memory device of claim 11, wherein the program instructions are further configured to cause the hardware processor to mark the new encryption key as active by setting an activation date attribute associated with the new encryption key.

17. The hardware memory device of claim 11, wherein the program instructions are further configured to cause the hardware processor to set a rotation attribute associated with the new key to true.

18. An Information Handling System (IHS), comprising:
a hardware processor; and a memory coupled to the processor, the memory having program instructions stored thereon that, upon execution by the processor, cause the IHS to:
monitor a cryptoperiod associated with a current encryption key being used to encrypt and decrypt data stored in the IHS;
in response to a determination that the current encryption key has reached an end of a cryptoperiod, transmit a request to a key provider for a new encryption key;
in response to the request:
receive the new encryption key, mark the current encryption key as old, un-encrypt the data using the old encryption key and re-encrypt the data using the new encryption key, wherein the old and new encryption keys are distinguished from each other during the un-encrypting and re-encrypting based upon each key's respective rotation attribute, wherein each rotation attribute is a value distinct from any cryptoperiod such that the new encryption key and the old encryption key can be further distinguished when both the encryption keys have different cryptoperiods, and wherein each rotation attribute indicates whether a respective encryption key is in rotation; and
in response to a determination that all of the data has been re-encrypted with the new encryption key, transmit a request to the key provider that the old encryption key be discarded.

19. The IHS of claim 18, wherein the program instructions are further configured to cause the IHS to request that the old encryption key be moved from a backup state to an archived state upon receipt of the new encryption key.

20. The IHS of claim 18, wherein the program instructions are further configured to cause the IHS to set a rotation attribute associated with the new key to true.

* * * * *